US008876294B2

(12) United States Patent
Saisho et al.

(10) Patent No.: US 8,876,294 B2
(45) Date of Patent: Nov. 4, 2014

(54) IMAGE FORMING APPARATUS AND VEHICLE ON WHICH THE IMAGE FORMING APPARATUS IS MOUNTED

(75) Inventors: Kenichiroh Saisho, Tokyo (JP); Hiroyuki Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 13/609,434

(22) Filed: Sep. 11, 2012

(65) Prior Publication Data

US 2013/0063754 A1 Mar. 14, 2013

(30) Foreign Application Priority Data

Sep. 14, 2011 (JP) ................. 2011-200839

(51) Int. Cl.

| | |
|---|---|
| *G03B 21/28* | (2006.01) |
| *G06K 15/02* | (2006.01) |
| *G02B 26/10* | (2006.01) |
| *G02B 26/08* | (2006.01) |
| *G02B 27/09* | (2006.01) |
| *G02B 27/01* | (2006.01) |
| *G02B 19/00* | (2006.01) |
| *B23K 26/06* | (2014.01) |
| *G02B 5/02* | (2006.01) |
| *G03B 33/06* | (2006.01) |
| *G03B 33/12* | (2006.01) |

(52) U.S. Cl.
CPC .......... *G02B 26/101* (2013.01); *G02B 26/0858* (2013.01); *G02B 26/105* (2013.01); *G02B 27/0966* (2013.01); *G02B 27/0101* (2013.01); *G02B 19/0057* (2013.01); *G02B 19/0028* (2013.01); *B23K 26/0639* (2013.01); *B23K 26/0643* (2013.01); *B23K 26/0648* (2013.01); *G02B 5/02* (2013.01); *G03B 21/28* (2013.01); *G03B 33/06* (2013.01); *G03B 33/12* (2013.01)

USPC .................. 353/11; 353/28; 359/631

(58) Field of Classification Search
USPC ........ 353/11–14, 79, 28, 98, 99, 78; 359/630, 359/631, 633; 345/7
See application file for complete search history.

(56) References Cited

U.S. PATENT DOCUMENTS

| 5,646,639 A * | 7/1997 | Koie ................................. 345/7 |
|---|---|---|
| 5,760,931 A | 6/1998 | Saburi et al. |

(Continued)

FOREIGN PATENT DOCUMENTS

| JP | H05-341226 | 12/1993 |
|---|---|---|
| JP | 3418985 | 6/2003 |

(Continued)

OTHER PUBLICATIONS

Extended European Search Report dated Jan. 2, 2013.

*Primary Examiner* — William C Dowling
(74) *Attorney, Agent, or Firm* — IPUSA, PLLC

(57) ABSTRACT

An image forming apparatus includes an optical scanning device including a light source element configured to radiate a light beam, an optical deflector configured to deflect the light beam two-dimensionally, and a target scanning surface that is transparent and having a two-dimensional image formed thereon by the light beam deflected from the optical deflector, and a projection optical system including a convex mirror and configured to enlarge and project the two-dimensional image on a target projection surface. The target projection surface includes a reflection surface of a half mirror. The half mirror is positioned outside of the image forming apparatus and configured to transmit a part of a light incident on the half mirror and reflect another part of the light incident on the half mirror.

12 Claims, 12 Drawing Sheets

(56) References Cited

U.S. PATENT DOCUMENTS

| | | | |
|---|---|---|---|
| 5,864,432 A * | 1/1999 | Deter | 359/634 |
| 8,675,283 B2 * | 3/2014 | Fujikawa et al. | 359/630 |
| 2009/0160736 A1 * | 6/2009 | Shikita | 345/7 |
| 2011/0128602 A1 | 6/2011 | Hamano et al. | |
| 2013/0094092 A1 * | 4/2013 | Imahori et al. | 359/633 |

FOREIGN PATENT DOCUMENTS

| | | |
|---|---|---|
| JP | 2004-226469 A | 8/2004 |
| JP | 2009-150947 | 7/2009 |
| JP | 2009-163122 A | 7/2009 |
| JP | 2010-049232 | 3/2010 |
| JP | 2010-145745 | 7/2010 |
| JP | 2010-145746 | 7/2010 |
| JP | 2010-145924 | 7/2010 |
| JP | 2010-276742 A | 12/2010 |
| JP | 2011-090076 A | 5/2011 |
| JP | 2011-128500 A | 6/2011 |

* cited by examiner

IMAGE FORMING APPARATUS AND VEHICLE ON WHICH THE IMAGE FORMING APPARATUS IS MOUNTED

BACKGROUND OF THE INVENTION

1. Field of the Invention

The present invention relates to an image forming apparatus and a vehicle on which the image forming apparatus is mounted; for example, an image forming apparatus including an optical scanning device for forming a two-dimensional image by scanning a light beam from an optical element, and a vehicle on which such image forming apparatus is mounted.

2. Description of the Related Art

In recent years, there has been widely proposed an optical scanning device that forms a two-dimensional image by irradiating multicolor light beams to a mirror that can scan in two-dimensional directions. Particularly, with an optical scanning device using a semiconductor laser as a light source, high light-use efficiency can be attained owing to the high directivity of a light beam irradiated from the semiconductor laser. Further, with the optical scanning device using a semiconductor laser, strong light can be generated inside the optical scanning device without requiring a large heat radiator such as a xenon lamp. In addition, owing to the high directivity of the optical scanning device using a semiconductor laser, a bright image can be formed even with a small size optical system.

An image forming apparatus such as a head-up display can be manufactured by using the optical scanning device using a semiconductor laser. Because such image forming apparatus is installed in, for example, a vehicle such as an automobile, the image forming apparatus is to be formed in a small size.

However, by pursing size-reduction of the image forming apparatus, there are problems such as being unable to attain brightness or being unable to provide a large size screen.

Patent Document 1: Japanese Laid-Open Patent Publication No. 2010-145745

Patent Document 2: Japanese Laid-Open Patent Publication No. 2010-145746

SUMMARY OF THE INVENTION

The present invention may provide an image forming apparatus and a vehicle on which an image forming apparatus is mounted that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image forming apparatus and a vehicle on which an image forming apparatus is mounted particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image forming apparatus including an optical scanning device including a light source element configured to radiate a light beam, an optical deflector configured to deflect the light beam two-dimensionally, and a target scanning surface that is transparent and having a two-dimensional image formed thereon by the light beam deflected from the optical deflector, and a projection optical system including a convex mirror and configured to enlarge and project the two-dimensional image on a target projection surface, wherein the target projection surface includes a reflection surface of a half mirror, wherein the half mirror is positioned outside of the image forming apparatus and configured to transmit a part of a light incident on the half mirror and reflect another part of the light incident on the half mirror.

Other objects, features and advantages of the present invention will become more apparent from the following detailed description when read in conjunction with the accompanying drawings.

DETAILED DESCRIPTION OF THE PREFERRED EMBODIMENTS

First Embodiment

Figure 1:
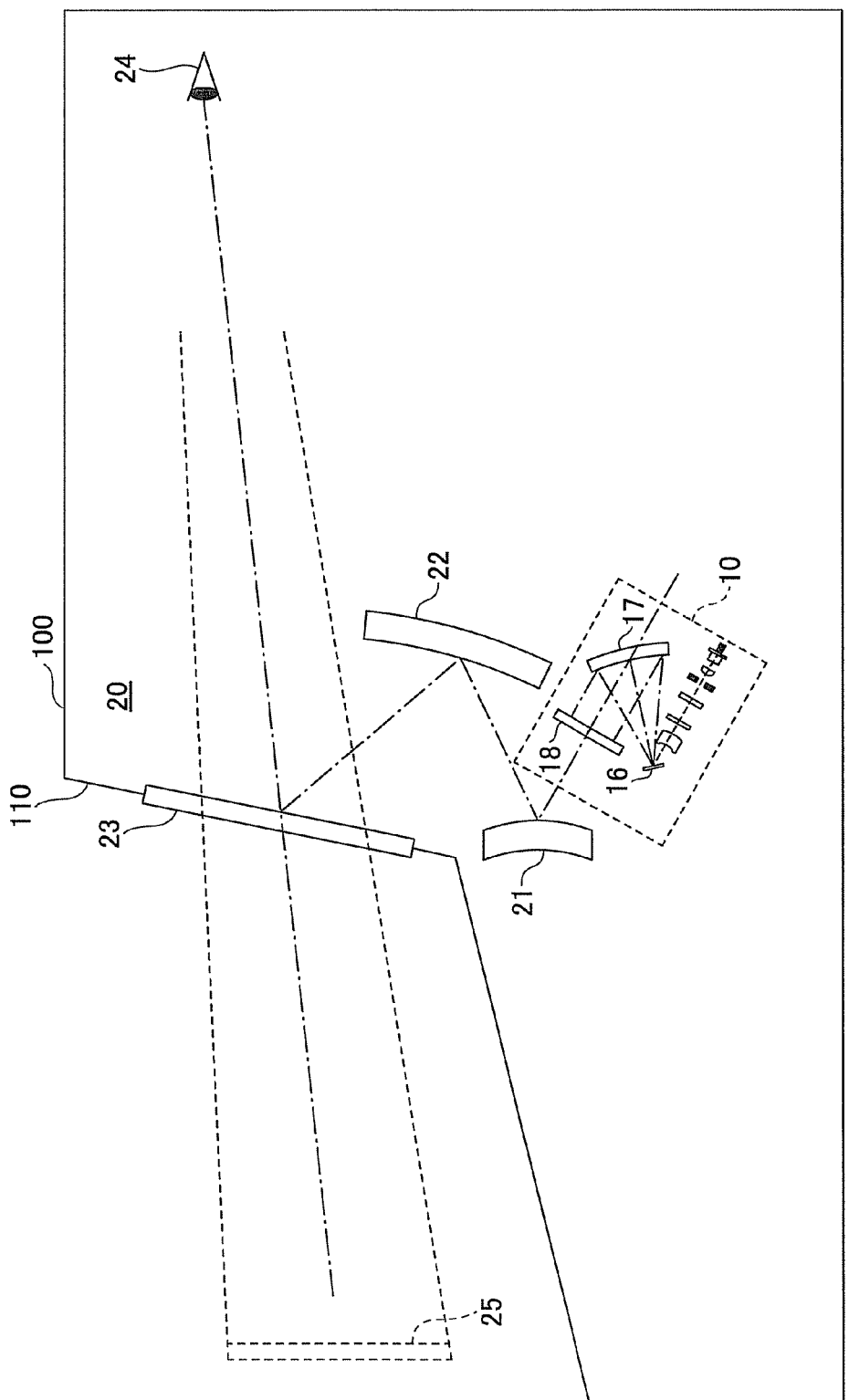
FIG. 1 is a schematic diagram illustrating an image forming apparatus according to a first embodiment of the present invention.

FIG. 1 is a schematic diagram illustrating an image forming apparatus 20 according to a first embodiment of the present invention. With reference to FIG. 1, the image forming apparatus 20 mainly includes, for example, an optical scanning device 10, a first mirror 21, a second mirror 22, and a half mirror 23. As described below, the half mirror 23 may be omitted from the image forming apparatus 20. In FIG. 1, reference numeral 24 indicates an eyeball of an observer that observes an image formed by the image forming apparatus 20 (hereinafter also referred to as "eyeball 24") and reference numeral 25 indicates a virtual image (hereinafter also referred to as "virtual image 25"). Further, reference numeral 100 indicates a vehicle on which the image forming apparatus 20 is mounted (hereinafter also referred to as "vehicle 100") and reference numeral 110 indicates a front window of the vehicle 100 (hereinafter also referred to as "front window 110").

Figure 2:
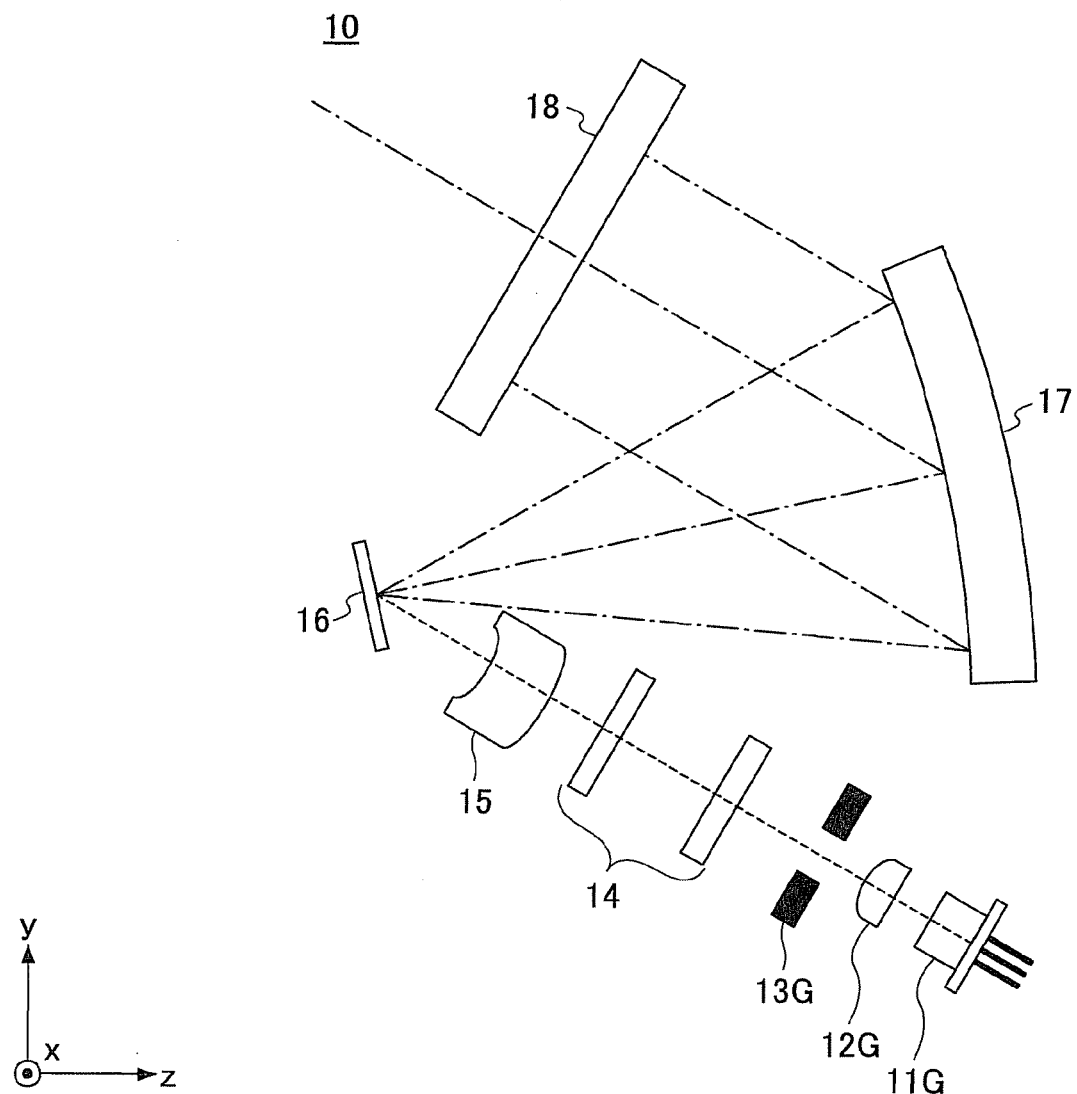
FIG. 2 is a schematic diagram illustrating an optical path of an optical scanning device according to the first embodiment of the present invention (part 1)
Figure 3:
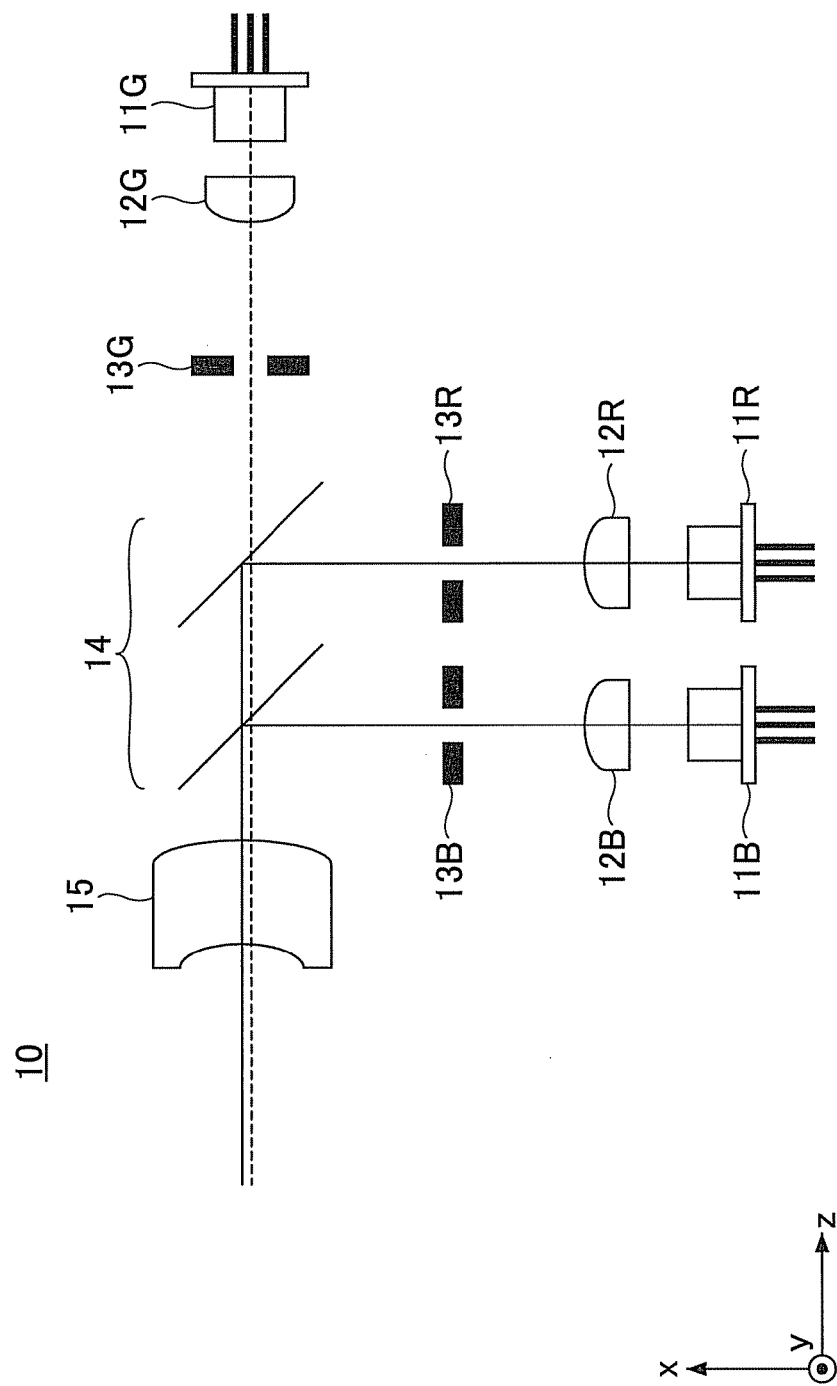
FIG. 3 is a schematic diagram illustrating an optical path of an optical scanning device according to the first embodiment of the present invention (part 2)

First, the optical scanning device 10 according to an embodiment of the present invention is described. FIG. 2 is a schematic diagram illustrating an optical path of the optical scanning device 10 (part 1) according to the first embodiment. FIG. 3 is another schematic diagram illustrating an optical path of the optical scanning device 10 (part 2) according to the first embodiment. FIGS. 2 and 3 are drawings of the optical scanning device 10 viewed from different directions. It is to be noted that the below-described optical deflector 16, concave mirror 17, and target scanning surface 18 of FIG. 2 are not illustrated in FIG. 3 for the sake of convenience.

With reference to FIGS. 2 and 3, the optical scanning device 10 mainly includes, for example, light source elements, 11R, 11G, 11B; coupling lenses 12R, 12G, 12B, apertures 13R, 13G, 13B, a compositing element 14, a lens 15, an optical deflector 16, a concave mirror 17, and a target scanning surface 18.

It is to be noted that the light source elements 11R, 11G, 11B, the coupling lenses 12R, 12G, 12B, the compositing element 14, and the lens 15 may be collectively referred to as an incident optical system. Further, the optical deflector 16, the concave mirror 17, and the target scanning surface 18 may be collectively referred to as a scanning optical system.

In the optical scanning device 10, the light source elements 11R, 11G, 11B can radiate light beams of different wavelengths λR, λG, λB, respectively. The wavelength λR may be, for example, 640 nm, the wavelength λG may be, for example, 530 nm, and the wavelength λB may be, for example, 445 nm. For example, a laser, an LED (Light Emitting Diode), or an SHG (Second Harmonic Generation) element may be used as the light source elements 11R, 11G, 11B.

From a standpoint of achieving size reduction while ensuring brightness and high image quality, it is preferable to use a semiconductor laser for each of the light source elements 11R, 11G, and 11B. A control unit (not illustrated) controls, for example, the light radiation power, and the light radiation timing of the light source elements 11R, 11G, and 11B. The control unit (not illustrated) may be mounted inside or outside of the optical scanning device 10.

The light beams, which are emitted from the corresponding light source elements 11R, 11G, 11B in accordance with image signals, are converted to substantially parallel beams or converging beams by corresponding coupling lenses 12R, 11G, 12B. The converted beams are incident on the apertures 13R, 13G, and 13G. For example, convex-shaped glass lens or plastic lenses may be used as the coupling lenses 12R, 12G, and 12B.

The apertures 13R, 13G, and 13B function to transform the shapes of the light beams incident on the apertures 13R, 13G, and 13B. The apertures 13R, 13G, and 13B may transform the light beams into various shapes (e.g., circular shape, elliptical shape, rectangular shape, quadrate shape) in correspondence with, for example, the angle of divergence (divergence angle) of the light beams.

Alternatively, the optical scanning device 10 may be configured having a single coupling lens and a single aperture that is shared by the light source elements 11R, 11G, and 11B instead of having plural corresponding coupling lenses and plural corresponding apertures. However, compared to the configuration having a single coupling lens and a single aperture, the configuration having plural corresponding coupling lenses and plural corresponding apertures has an advantage of being able to adjust the diameter of the beam spot formed on the target scanning surface 18 while attaining sufficient light-use efficiency regardless of the difference of divergence angles among the light source elements 11R, 11G, 11B.

The light beams, which are transformed (shaped) by the apertures 13R, 13G, 13B, are incident to the compositing element 14. The compositing element 14 combines (composites) the optical paths of the transformed light beams that are incident on the compositing element 14. The compositing element 14 may be, for example, a dichroic mirror having a plate-like or a prism-like shape. The compositing element 15 has a function of combining (compositing) light beams into a single optical path by reflecting the light beams therefrom or transmitting the light beams therethrough in accordance with the wavelength of the light beams.

The light beams whose optical paths are combined by the compositing element 14 are guided to a reflection surface of the light deflector 16 by the lens 15. For example, a single meniscus lens having a concave surface side (a side of the meniscus lens on which the concave surface is formed) facing the optical deflector 16 may be used as the lens 15. Next, the lens 15 is described in further detail with reference to FIG. 4.

Figure 4:
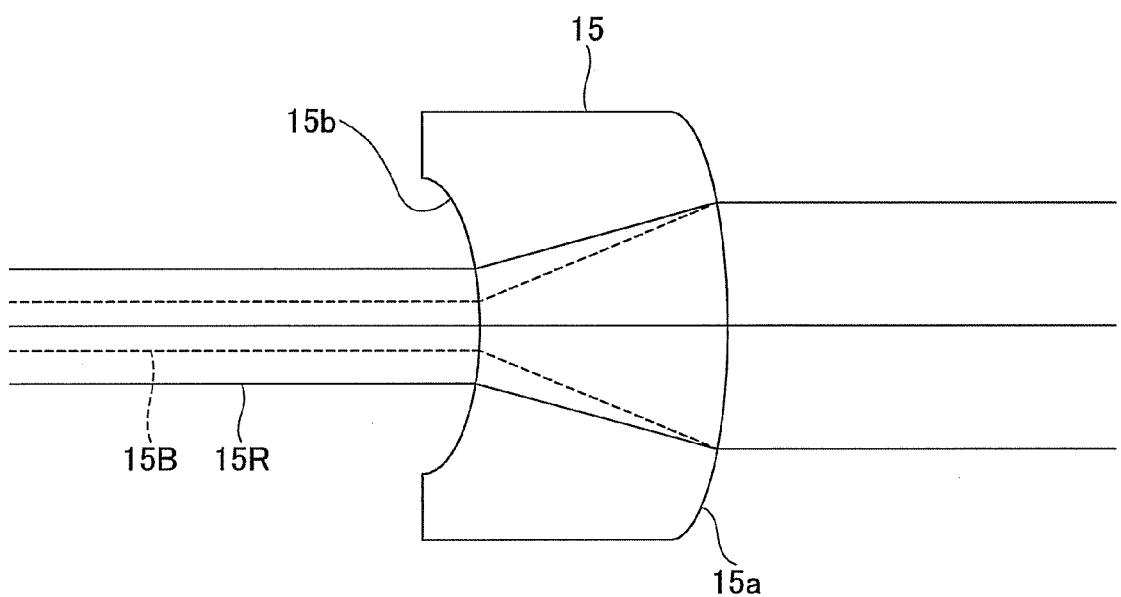
FIG. 4 is a schematic diagram for describing a lens according to an embodiment of the present invention.

FIG. 4 is a schematic diagram for describing the lens 15 according to an embodiment of the present invention. In FIG. 4, two light beams 15R, 15B, which have wavelengths different from each other, are incident to the lens 15. The lens 15 has a first surface 15a and a second surface 15b positioned opposite to the first surface 15b. It is preferable for the light beams 15R and 15B to be radiated from the second surface 15b in a size falling within a reflection surface of the optical deflector 16. That is, it is desired that the lens 15 be able to reduce the size of the light beams 15R, 15B that have traveled through the apertures 13R, 13B and guide the reduced light beams 15R, 15B to the optical deflector 16. Therefore, it is preferable for the first surface 15a of the lens 15 to be a convex surface, so that the light beams 15R, 15B can be converged into light beams having desired light beam diameters, respectively.

In a case where the light beam 15R has a long wave length and the light beam 15B has a short wavelength, the manner in which the light beam 15R is converged at the first surface 15a is different from the manner in which the light beam 15B is converged at the first surface 15a as illustrated in FIG. 14. That is, the light beam 15R and the light beam 15B are dispersed (refracted) differently at the first surface 15a in a case where the light beam 15R has a long wavelength and the light beam 15B has a short wavelength. In a case where the lens 15 has a shape other than that of a meniscus lens (e.g., a lens having a convex surface on both sides, or a lens having a flat surface on one side and a convex surface on the other side), the divergence angles of the light beams 15R, 15B transmitted from the lens 15 vary in accordance with the wavelengths of the light beams 15R, 15B.

By using a concave surface of a meniscus lens 15 as the second surface 15b of the lens 15, the light beams 15R, 15B dispersed at the first surface 15a are refracted by the second surface 15b in a manner that the direction of the divergence of the light beams 15R, 15B is returned back to a state before being dispersed at the first surface 15a. As a result, in a case where the light beams 15R, 15B having different wavelengths are incident on the lens 15, the lens 15 prevents varying of the divergence of the light beams 15R, 15B transmitted therefrom and guides the light beams 15R, 15B to the optical deflector 16. Thereby, brightness of an image formed by the image forming apparatus 20 can be improved without loss of light quantity of light beams having specific wavelengths.

Returning to FIGS. 2 and 3, the light beam radiated from the incident optical system and guided to the reflection surface of the optical deflector 16 is two-dimensionally deflected by the optical deflector 16. The optical deflector 16 may be, for example, a single fine-sized mirror that can oscillate relative to 2 perpendicularly intersecting axes, a single fine-sized mirror that can oscillate relative to a single axis, or a single fine-sized mirror that can rotate in multiple directions. For example, the optical deflector 16 may be a MEMS (Micro Electro Mechanical System) mirror manufactured by a semiconductor process. The optical deflector 16 may be driven by, for example, an actuator that exerts a driving force generated by deformation force of a piezoelectric element.

The light beam deflected two-dimensionally by the optical deflector 16 is incident on the concave mirror 17 and reflected by the concave mirror 17. Thereby, a two-dimensional image is formed (depicted) on the target scanning surface 18 by the light beam reflected from the concave mirror 17. The optical deflector 16, the concave mirror 17, and the target scanning surface 18 are preferred to be arranged, so that the light beam incident on the target scanning surface 18 has substantially the same orientation as the orientation of the light beam incident to the optical deflector 16. By such arrangement of the optical deflector 16, the concave mirror 17, and the target scanning surface 18, distortion of the two-dimensional image formed on the target scanning surface 18 can be reduced. Because the light beam incident on the target scanning surface 18 is substantially orthogonal to the target scanning surface 18, high transmission efficiency can be attained for a large area of the two-dimensional image.

Owing to the concave mirror 17 used in the optical scanning device 10, the following effects can be attained.

As the first effect, deviation of a color(s) of the image formed on the target scanning surface 18 can be prevented because the concave mirror 17 has no wavelength dispersion. As the second effect, deviation of a color(s) of the image formed on the target scanning surface 18 can also be prevented because the concave mirror 17 reduces the scanning angle of the light beam incident on the target scanning surface 18. As the third effect, the concave mirror 17 can reduce the incident angle of the target scanning surface 18 for all scanning angles on the target scanning surface 18, to thereby increase the brightness of the target scanning surface 18. In this embodiment, the term "deviation of color(s)" refers to deviation of the position(s) of one or more beam spots formed on the target scanning surface 18 by the light source elements 11R, 11G, 11B having different wavelengths. As the fourth effect, size-reduction of the optical scanning device 10 can be achieved by returning optical paths from the concave mirror 17.

Because at least one side of the surface of the concave mirror 17 does not have an arcuate shape, the rate characteristic of the light beams scanned on the target scanning surface can be corrected. In other words, the concave mirror 17 provides an isokinetic property to the light beam deflected by the optical deflector 16. Thereby, the pitch of the pixels of the image formed on the target scanning surface 18 can be equalized (consistent pixel pitch).

It is possible for a Fresnel lens or a refractive lens to be positioned immediately in front of (immediately before) the target scanning surface 18 instead of the concave mirror 17. However, in a case where a Fresnel lens is used instead of the concave mirror 17, a shadow(s) is formed at a serrate-shaped back cut part of the Fresnel lens and causes undesired loss of light quantity. Further, in a case where a refractive lens is used instead of the concave mirror 17, scattering of multiple light beams occurs and causes the multiple light beams to deviate from their intended positions in accordance with wavelength. As a result, an undesired problem of color deviation occurs.

The target scanning surface 18 is a surface having transparency (transmission) enabling a two-dimensional image to be formed thereon by an incident light beam reflected from the concave mirror 17. For example, a diffuser may be used as the target scanning surface 18. The diffuser has a function of scattering incident light in a direction in which the incident light travels. It is possible for a micro lens array to be used instead of the diffuser. However, in a case of using a micro lens array, the forming of shadows between the lenses of the micro lens array causes a significant loss of light quantity. This results in an undesired problem of decrease of light-use efficiency.

On the other hand, the diffusion angle of transmitted light can be selected by designing the surface of the diffuser into a predetermined shape. Therefore, it is preferable to use the diffuser as the target scanning surface 17 because the diffuser can reduce loss of light quantity of the light beam that is to be guided to a subsequent optical system. For example, it is possible for the diffuser to diffuse light to the extent (range) necessary while maintaining high transmittance by, for example, randomly forming fine-sized concavities and convexities that are equal to or less than the wavelengths of the light being used on the surface of the diffuser or forming a linear concave-convex shape on the surface of the diffuser.

Figure 5:
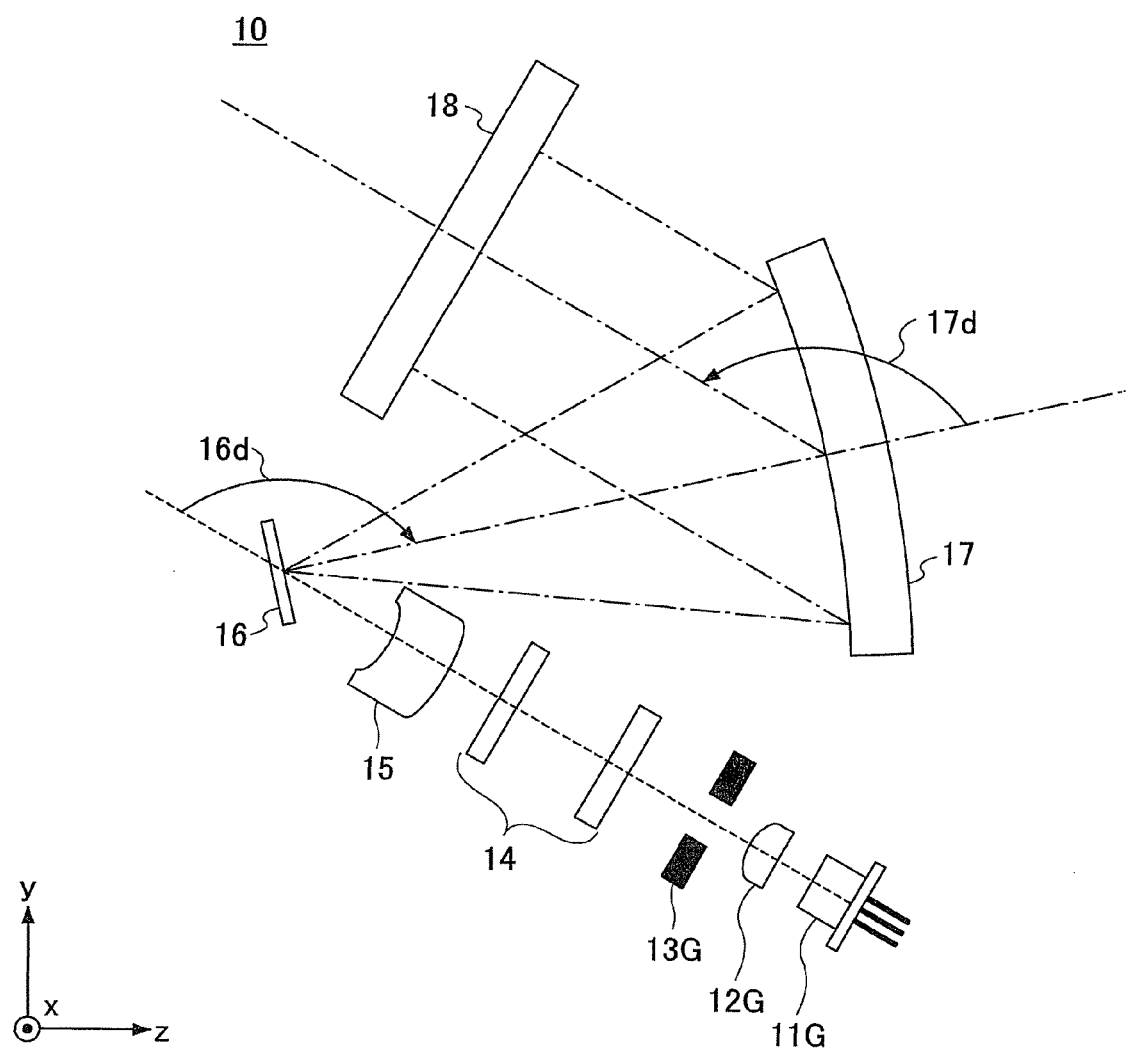
FIG. 5 is a schematic diagram for describing an arrangement of an optical deflector and a concave mirror according to an embodiment of the present invention.

Next, the arrangement of the optical deflector 16 and the concave mirror 17 according to an embodiment of the present invention is described with reference to FIG. 5. FIG. 5 is a schematic diagram for describing the arrangement of the optical deflector 16 and the concave mirror 17 according to an embodiment of the present invention. In FIG. 5, the optical deflector 16 and the concave mirror 17 are arranged, so that the sign of the deflection angle of the optical deflector 16 and the sign of the deflection angle of the concave mirror 17 (i.e. an angle formed by light beams incident on and deflected from the optical deflector 16 and angle formed by light beams incident on and reflected from the concave mirror 17) become opposite to each other (i.e. positive or negative). The optical path of the light beam incident on the optical deflector 16, deflected by the deflector 16, and reflected from the concave mirror 17 forms a shape of a letter "Z" when viewing the optical deflector 16 and the concave mirror 17 from a direction (X direction) that is perpendicular to a YZ plane.

In the YZ plane, assuming that a positive deflection angle is an angle measured in a counter-clockwise direction starting from a direction in which an incident light beam travels, the sign of a deflection angle $16d$ of the optical deflector 16 is negative, and the sign of a deflection angle $17d$ of the concave mirror 17 is positive. Accordingly, the optical deflector 16 and the concave mirror 17 are arranged, so that the signs of the deflection angle $16d$ of the optical deflector 16 and the deflection angle $17d$ of the concave mirror 17 become opposite to each other. Owing to this arrangement of the optical deflector 16 and the concave mirror 17, the difference between the optical path of the light beam reaching an upper edge of the target scanning surface 18 and the optical path of the light beam reaching a lower edge of the target scanning surface 18 becomes smaller. As a result, trapezoidal distortion or bending of an image formed on the target scanning surface 18 can be reduced.

In a case where trapezoidal distortion or bending of an image occurs when the above-described arrangement of the optical deflector 16 and the concave mirror 17 is not used, it is possible to electrically correct the trapezoidal distortion or bending. Even if the trapezoidal distortion or bending is corrected, the image becomes dark owing to invalid pixels generated by the correction. In contrast, sufficient brightness and high quality can be attained with the image forming apparatus 20 using the optical scanning device 10 because trapezoidal distortion and bending can be reduced without performing electrical correction.

Thus, in the above-described embodiment of the present invention where a multicolor image is formed on the target scanning surface 18 by scanning light beams of different wavelengths radiated from the light source elements 11R, 11G, and 11B, the optical deflector 16 and the concave mirror 17 are arranged in an optical path of the light beams, so that the sign of the deflection angle 16*d* of the optical deflector 16 and the sign of the deflection angle 17*d* of the concave mirror 17 are opposite to each other. By such arrangement of the optical deflector 16 and the concave mirror 17, the following effects can be attained.

That is, by using the concave mirror 17, color deviation of the image formed on the target scanning surface 18 can be reduced. Further, the incidence angle of the target scanning surface 18 can be reduced for all scanning angles. Thereby, the brightness of the target scanning surface 18 can be increased. Further, the difference between the optical path of the light beam reaching an upper edge of the target scanning surface 18 and the optical path of the light beam reaching a lower edge of the target scanning surface 18 becomes smaller by arranging the optical deflector 16 and the concave mirror 17, so that the sign of the deflection angle 16*d* of the optical deflector 16 and the sign of the deflection angle 17*d* of the concave mirror 17 are opposite to each other. Therefore, trapezoidal distortion and bending of the image formed on the target scanning surface 18 can be reduced. Further, the size of the optical scanning device 10 can be reduced by using the concave mirror 17. In other words, size-reduction of the optical scanning device 10 can be achieved while ensuring sufficient brightness and high quality of the image formed with the optical scanning device 10.

Next, the first mirror 21, the second mirror 22, and the half mirror 23 are described with reference to FIG. 1. In the first embodiment of the present invention, a convex mirror is used as the first mirror 21, a concave mirror is used as the second mirror 22, and a half mirror having a flat reflection surface is used as the half mirror 23. In the below-described Examples 1-3 of the present invention, at least one of the first mirror 21 and the second mirror 22 may be a convex mirror. It is to be noted that the first and the second mirrors 21, 22 may also be collectively referred to as a "projection optical system".

In the image forming apparatus 20, each of the light beams transmitted through the target scanning surface 18 of the optical scanning device 10 is returned (reflected) by the first mirror 21 and is incident to the second mirror 22. Then, each of the light beams incident on the second mirror is returned (reflected) by the second mirror 22 and is incident on the half mirror 23.

Because the first mirror (in this embodiment, convex mirror) 21 is positioned immediately in back of (immediately after) the target scanning surface 18 in the image forming apparatus 20, sunlight that enters into the entire optical system of the image forming apparatus 20 is diffused by the first mirror (convex mirror) 21. Therefore, sunlight entering into the entire optical system of the image forming apparatus 20 can be prevented from concentrating on the target scanning surface 18. Further, the convex surface of the first mirror 21 can widen the angle of view of an intermediate image having a limited (finite) angle of divergence and reduce the length of the entire optical path of the image forming apparatus 20. Therefore, the first mirror 21 is suited for size-reduction of the image forming apparatus 20. The first mirror 21 also has an advantage of preventing chromatic aberration with respect to a lens.

The half mirror 23 has a transmittance in a visible range of approximately 10%-70%. A reflection surface of the half mirror 23 is provided on a side on which the light beam reflected from the second mirror 22 is incident. For example, a multilayer dielectric or a wire grid may be formed in the reflection surface of the half mirror 23. The reflection surface of the half mirror 23 can selectively reflect wavebands of the light beams radiated from the light source elements 11R, 11G, and 11B. In other words, the reflection surface of the half mirror 23 can increase reflectivity for light beams having a reflection peak including the wavelengths λR, λG, λB, a reflection band including the wavelengths λR, λG, λB or reflectivity with respect to a certain deflection direction.

In the first embodiment, the reflection surface of the half mirror 23 is flat whereas a surface of the half mirror 23 opposite to the reflection surface is substantially parallel to the reflection surface. Accordingly, the thickness of the half mirror 23 is substantially uniform.

In other words, the half mirror 23 can selectively reflect wavelength bands of the light beams radiated from the light source elements 11R, 11G, and 11B. Accordingly, brightness of an image formed by radiating multiple light beams of a particular wavelength from the optical scanning device 10 can be increased.

It is to be noted that the reflection surface of the first mirror 21 can be an anamorphic surface. That is, the reflection surface of the first mirror 21 enables a curvature of a predetermined direction to be different from a curvature of a direction orthogonal to the predetermined direction. By using an anamorphic surface as the reflection surface of the first mirror 21, the curved shaped of the reflection surface can be adjusted. Thereby, reflection aberration correction performance of the first mirror 21 can be improved.

Figure 6:
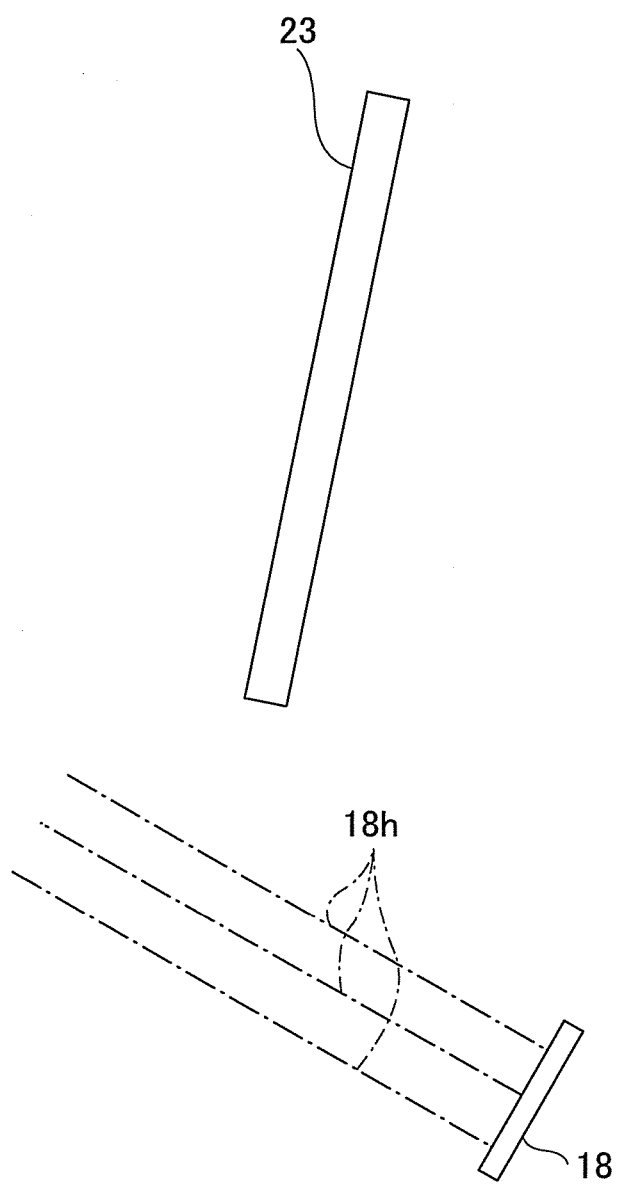
FIG. 6 is a schematic diagram for describing a positional relationship between a target scan surface and a half mirror according to an embodiment of the present invention.

FIG. 6 is a schematic diagram for describing a positional relationship between the target scanning surface 18 and the half mirror 23 according to an embodiment of the present invention. As illustrated in FIG. 6, the target scanning surface 18 and the half mirror 23 are arranged in the image forming apparatus 20, so that a normal line of the target scanning surface 18 does not intersect the half mirror 23. By arranging the target scanning surface 18 and the half mirror 23 in this manner, stray light transmitted from the target scanning surface 18 can be prevented from entering the half mirror 23. Thereby, a ghost image can be prevented from being formed in the target scanning surface 18.

Although only 3 lines are illustrated as normal lines 18*h* of the target scanning surface 18, the target scanning surface 18 and the half mirror 23 are arranged, so that all of the normal lines (including the 3 normal lines 18*h* illustrated in FIG. 6) of the target scanning surface 18 do not intersect with the half mirror 23.

Figure 7:
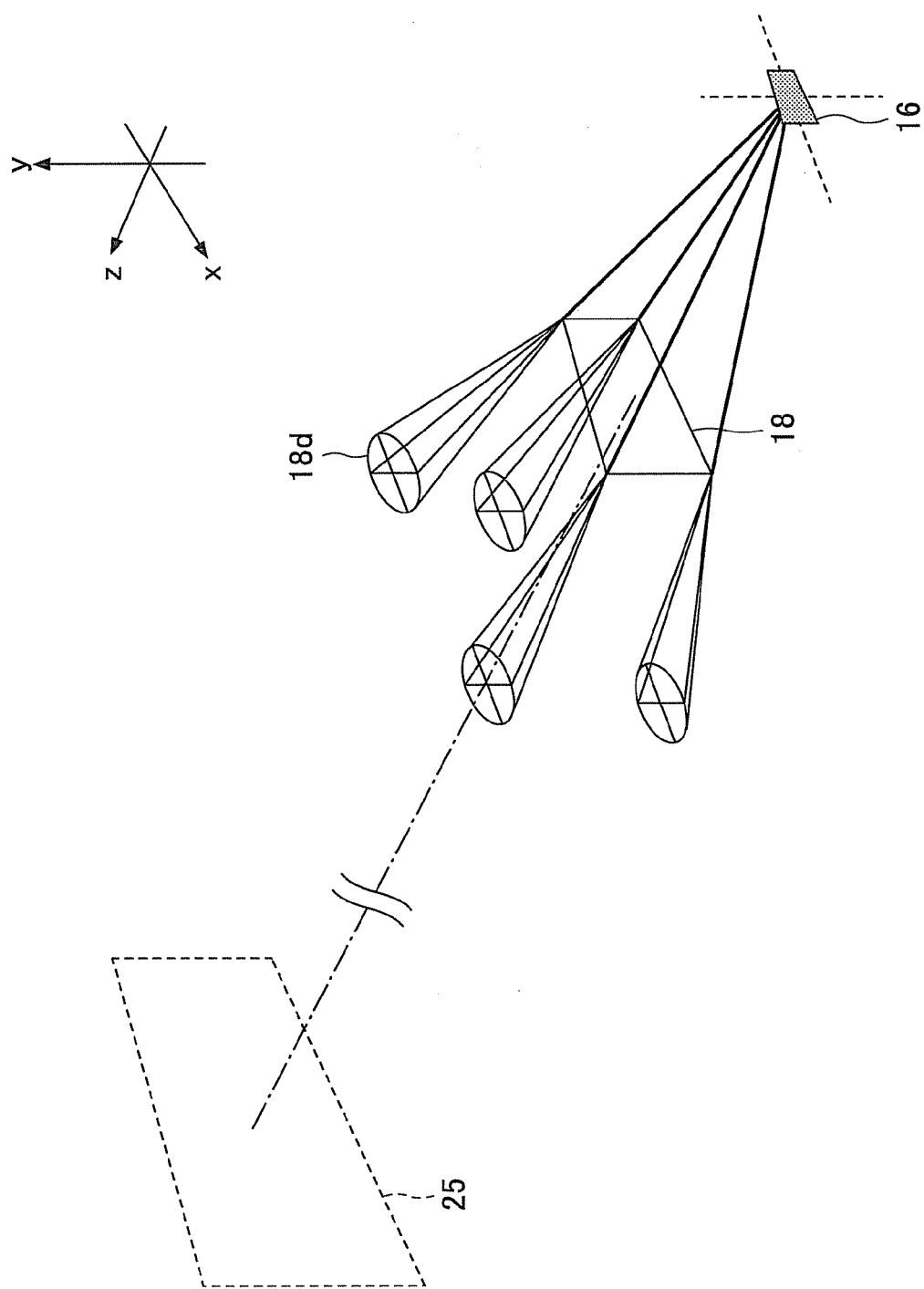
FIG. 7 is a schematic diagram for describing a cross section of each light beam transmitted through a target scan surface according to an embodiment of the present invention.

Next, the shape of a cross section of each of the light beams transmitted through the target scanning surface 18 of the optical scanning device 10 is described with reference to FIG. 7. FIG. 7 is a schematic diagram for describing a cross section of each of the light beams transmitted through the target scanning surface 18 according to an embodiment of the present invention. It is to be noted that the optical path from the optical deflector 16 to the virtual image 25 is illustrated as a straight line for the sake of convenience.

As illustrated in FIG. 7, the cross section of each of the light beams transmitted through the target scanning surface 18 of the optical scanning device 10 can be formed into an elliptical shape. In other words, by using a diffuser as the target scanning surface 18, the cross section 18*d* of each of the light beams diffused by the diffuser can be formed into an elliptical shape. In a case where the aspect ratio (vertical (Y direction):

horizontal (X direction)) of the virtual image 25 is 1:4, it is preferable for the cross section 18*d* of each of the light beams to be an elliptical shape having a vertical/horizontal ratio of approximately 1:4.

Accordingly, by using a diffuser as the target scanning surface 18, forming the cross section of each of the light beams diffused by the diffuser into an elliptical shape, and matching a long axis (major axis) direction of the elliptical shape with a longitudinal direction of the virtual image 25, there can be obtained an optical system having substantially all of the light beams (rays) transmitted from the target scanning surface 18 contribute to forming an image (image formation).

In forming an image where the virtual image 25 has a long side in the X direction similar to the target scanning surface 18 having a long side in the X direction, the light-use efficiency in the Y direction is degraded and the image cannot attain high brightness if the cross-section of each of the light beams has, for example, a circular shape. In contrast, because the cross section 18*d* of each of the light beams has an elliptical shape having an vertical/horizontal ratio matching the aspect ratio of the virtual image 25, the optical scanning device 10 according to an embodiment of the present invention is able to improve light-use efficiency in the Y direction and form an image having high brightness.

The image forming apparatus 20 according to an embodiment of the present invention can be mounted on the vehicle 100 such as an automobile. In such case of mounting the image forming apparatus 20 on the vehicle 100, the image forming apparatus 20 may be integrated with a component such as the front window 110 of the vehicle 100. By mounting the image forming apparatus 20 on the vehicle 100 in a position in front of a driver of the vehicle 100, the light beam(s) reflected from the reflection surface of the half mirror 23 (including a case where the half mirror 23 is integrated with the front window 110 of the vehicle 100) is incident on the eyeball 24 of the driver in a driver seat of the vehicle 100. Thereby, a two-dimensional image formed on the target scanning surface 18 is visually recognized by the driver as an enlarged (magnified) virtual image 25 at a predetermined position in front of the reflection surface of the half mirror 23 (including a case where the half mirror 23 is integrated with the front window 110 of the vehicle 100).

Hence, a so-called head-up display (HUD) can be realized by using the image forming apparatus 20 according to the above-described embodiment of the present invention. In a case where the image forming apparatus 20 is used for a head-up display, the two-dimensional image formed on the target scanning surface 18 may be, for example, measurement data of a measuring instrument of the vehicle 100 or map data. Because the virtual image 25 is viewed at a predetermined position in front of the reflection surface of the half mirror 23 (including a case where the half mirror 23 is integrated with the front window 110 of the vehicle 100), the driver of the vehicle 100 can view, for example, measurement data or map data without having to significantly move his/her focus (viewpoint) in a state looking forward (head-up position).

Accordingly, a virtual image 25, which is an enlarged (magnified) image of a two-dimensional image formed on the target scanning surface 18 of the optical scanning device 10, can be obtained with the above-described embodiment of the image forming apparatus 20 including the first mirror 21, the second mirror 22, and the half mirror 23. Thereby, a so-called head-up display can be obtained.

According to the description above, there may be an embodiment in which the half mirror 23 is included as a component of the image forming apparatus 20 and an embodiment in which the half mirror 23 is not included as a component of the image forming apparatus 20. In the embodiment where the half mirror 23 is not included as a component of the image forming apparatus 20, the front window 110 of the vehicle 100 may be accommodated with a function(s) of the half mirror 23.

With the image forming apparatus 20 according to the above-described first embodiment of the present invention, there can be obtained a projection optical system including the optical scanning device 10 and the convex mirror in which the optical deflector 16 deflects light beams radiated from the light source elements 11R, 11G, 11B two-dimensionally and forms a two-dimensional image on the target scanning surface 18 having a transparent property. Further, the target scanning surface (diffuser) 18 can form the virtual image 25 by enlarging and projecting the two-dimensional image in a predetermined position on a side opposite to the reflection surface of the half mirror 23.

By having the optical scanning device 10 included in the image forming apparatus 20, it becomes possible to set the angle of divergence of an image to be formed (including an intermediate image). Moreover, it becomes easier to control the angle of divergence of the intermediate image. Thereby, in an optical system including optical devices including the optical deflector 16 and those positioned after the optical deflector 16, the optical system can attain high efficiency with little loss of light quantity. As a result of obtaining a highly efficient optical system, high brightness can be formed without having to use large-sized light source elements. In other words, by being able to set the angle of divergence of the target scanning surface 18 to a desired value, loss of light quantity can be prevented, and images having high brightness can be formed.

By providing a projection optical system including a convex mirror in the image forming apparatus 20, in a case where scanning is performed using a semiconductor laser as an light source element, the angle of view can be widened for an intermediate image having a narrow divergence angle by the convex mirror. Thereby, the screen size of the image forming apparatus 20 can be increased and size reduction of the image forming apparatus 20 can be achieved.

That is, by providing a projection optical system including the above-described optical scanning device 10 and the convex mirror, the image forming apparatus 20 can attain high brightness, increase screen size, and achieve size-reduction at the same time.

In a case of a panel type image forming apparatus which does not perform optical scanning (e.g., non-scanning type image forming apparatus such as a liquid crystal panel or a digital light processor), it is difficult to attain high brightness, increase screen size, and achieve size-reduction at the same time. This is due to the difficulty of preventing loss of light quantity by controlling the divergence angle of the light from the intermediate image. Further, in order to attain high brightness for a panel-type image forming apparatus, the panel-type image forming apparatus would require a strong light source that can illuminate a single screen as a whole. Thus, the panel-type image forming apparatus requires large heat releasing components such as a heat sink. This prevents size-reduction of the panel-type image forming apparatus.

Modified Example of First Embodiment

In the modified example of the first embodiment, the arrangement of optical elements in an optical scanning device is different from that of the optical scanning device 10 of the first embodiment. In the modified example of the first embodiment, like components are denoted with like reference numerals as those of the first embodiment and are not further described.

Figure 8:
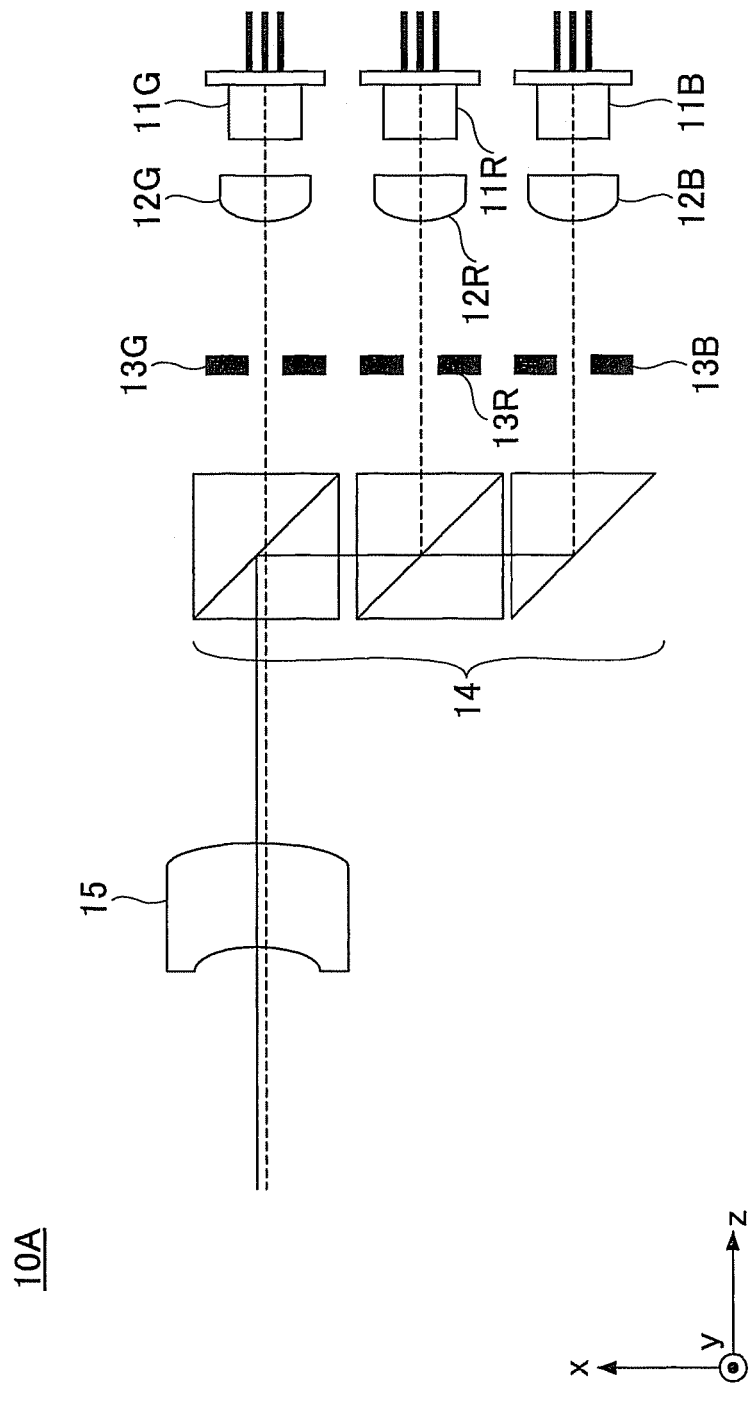
FIG. 8 is a schematic diagram illustrating an optical path of an optical scanning device according to a modified example of the first embodiment of the present invention.

FIG. 8 is a schematic diagram illustrating an optical path of an optical scanning device 10A according to the modified example of the first embodiment. More specifically, FIG. 8 illustrates the optical path of the optical scanning device 10A viewed from the same direction as FIG. 3. Similar to FIG. 3, the optical deflector 16, the concave mirror 17, and the target scanning surface 18 are not illustrated in FIG. 8 for the sake of convenience. In the optical scanning device 10A, the arrangement of the optical deflector 16, the concave mirror 17, and the target scanning surface 18 is substantially the same as that of the optical scanning device 10.

In the optical scanning device 10A illustrated in FIG. 8, a group including the light source element 11R, the coupling lens 12R, and the aperture 13R, a group including the light source element 11G, the coupling lens 12G, and the aperture 13G, and a group including the light source element 11B, the coupling lens 12B, and the aperture 13B are arranged substantially parallel to a direction in which each corresponding light beam travels.

Similar to the optical scanning device 10, the light beams formed (shaped) by the aperture 13R, 13G, and 13B are incident on the compositing element 14 and have their optical paths composited (combined) by the compositing element 14. Further, the optical system including the compositing element 14 and optical devices positioned after the compositing element 14 operate in a similar manner as those of the optical scanning device 10.

Accordingly, the arrangement of optical devices such as the light source element, the coupling lens, the aperture, and the compositing element can be discretionarily decided. Thus, in the image forming apparatus 20 according to the modified example, the optical scanning device 10A may be used instead of the optical scanning device 10.

Next, first-third examples of the first embodiment of the present invention are described. More specifically, the first-third examples of the first embodiment of the present invention are design examples of the first mirror 21, the second mirror 22, and the half mirror 23.

First Example

Figure 9:
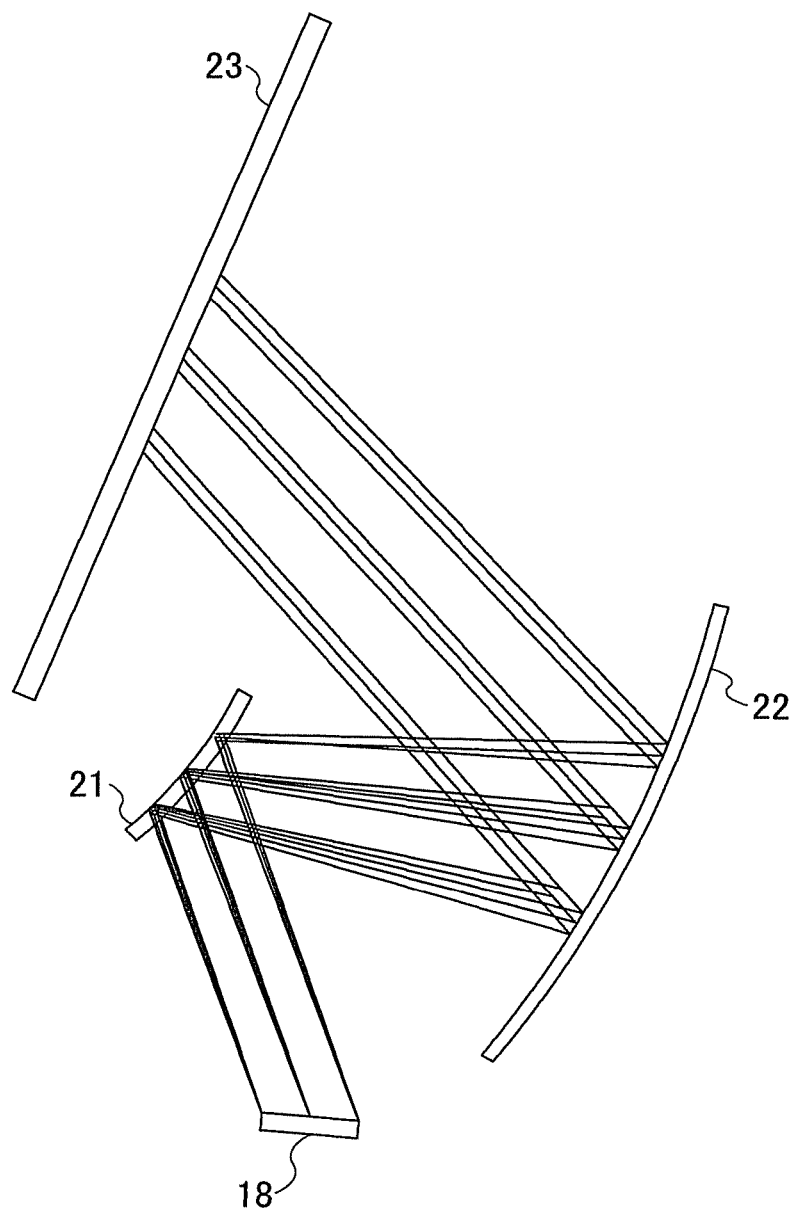
FIG. 9 is a schematic diagram illustrating an optical system according to an embodiment of the present invention.

FIG. 9 is a schematic diagram illustrating an optical system according to the first example. As illustrated in FIG. 9, a convex mirror is used as the first mirror 21, a concave mirror is used as the second mirror 22, and a half mirror having a flat reflection surface is used as the half mirror 23 in the first example.

In the first example, although the light beams transmitted from the target scanning surface 18 are incident on the first mirror (convex mirror) 21, the first mirror 21 increases the radiation angle of the incident light beams. Thereby, the length of the optical paths in the image forming apparatus can be shortened.

In order to allow a driver of the vehicle 100 to view the enlarged virtual image 25, a final power surface is to have enough power to converge multiple light beams. Because the half mirror 23 of the first example has a flat surface, a concave mirror is to be used as the second mirror 22, so that the entire projection optical system can have a positive power. With the configuration of the first example, the projection optical system can be formed having a depth (lateral direction in FIG. 9) that is substantially close to an effective diameter of the half mirror 23.

Next, optical data of the first example are illustrated in Tables 1-3.

TABLE 1

|  | FIRST MIRROR 21 | SECOND MIRROR 22 | HALF MIRROR 23 |
| --- | --- | --- | --- |
| SURFACE SHAPE | CONVEX SHAPE | CONCAVE SHAPE | FLAT SHAPE |
| CURVATURE RADIUS | 156 mm | 270 mm | INFINITE |
| INCIDENT ANGLE | −31 DEGREES | 20 DEGREES | 24 DEGREES |

TABLE 2

|  | TARGET SCANNING SURFACE 18 ~FIRST MIRROR 21 | FIRST MIRROR 21 ~SECOND MIRROR 22 | SECOND MIRROR 22 ~HALF MIRROR 23 |
| --- | --- | --- | --- |
| SURFACE INTERVAL | 65 mm | 80 mm | 120 mm |

TABLE 3

|  | TARGET SCANNING SURFACE 18 |
| --- | --- |
| RADIATION ANGLE OF TARGET SCANNING SURFACE | X DIRECTION: 0 DEGREES, Y DIRECTION: 0 DEGREES |

It is to be noted that, in the first example, the position (image plane position) of the virtual image 25 is 2 m apart from the eyeball 24 of the driver. Further, in the first example, the angle of view (surface angle view) of the virtual image 25 is 12×3 deg.

Second Example

Figure 10:
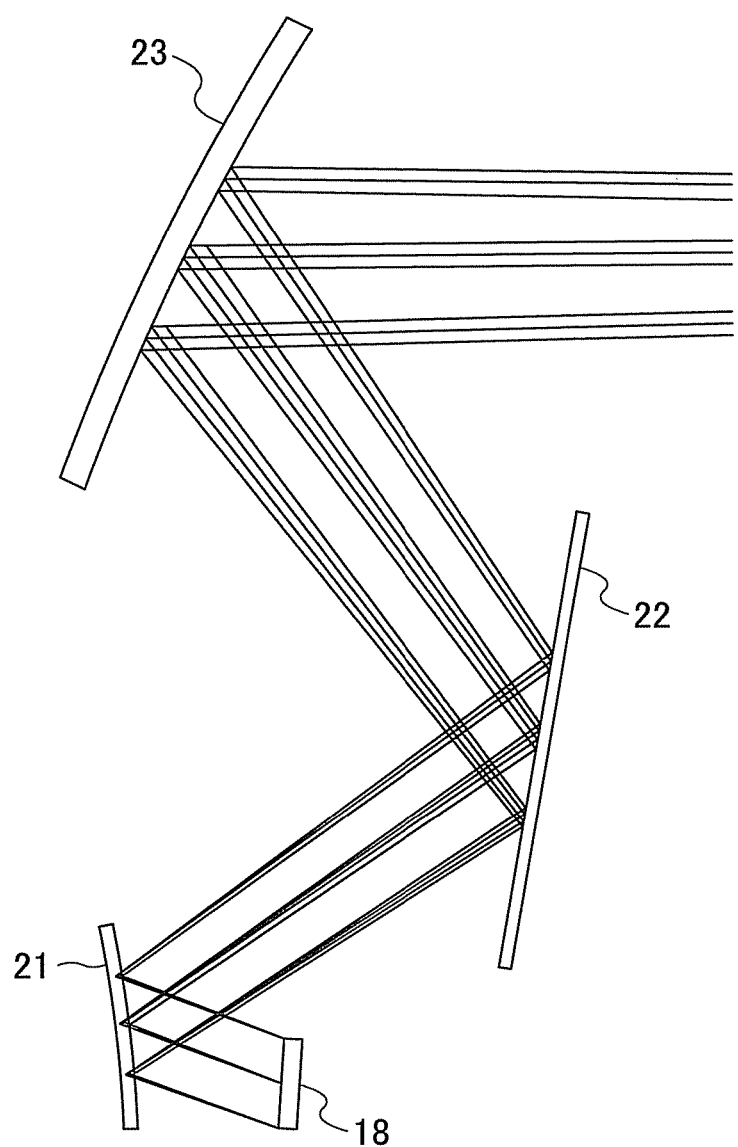
FIG. 10 is a schematic diagram illustrating an optical system according to another embodiment of the present invention.

FIG. 10 is a schematic diagram illustrating an optical system according to the second example. As illustrated in FIG. 10, a convex mirror is used as the first mirror 21, a flat mirror is used as the second mirror 22, and a half mirror having a concave reflection surface is used as the half mirror in the second example. In the second example, although the reflection surface of the half mirror 23 is a concave surface, a surface of the half mirror 23 opposite to the reflection surface is substantially parallel to the reflection surface. In other words, the thickness of the half mirror 23 is substantially uniform.

In the second example, the convex surface of the first mirror 21 is an anamorphic surface in which a curvature of a predetermined direction is different from a curvature of a direction orthogonal to the predetermined direction. By using an anamorphic surface as the reflection surface of the first mirror 21, the curved shaped of the convex surface of the first mirror 21 can be adjusted. Thereby, reflection aberration correction performance of the first mirror 21 can be improved.

Figure 11:
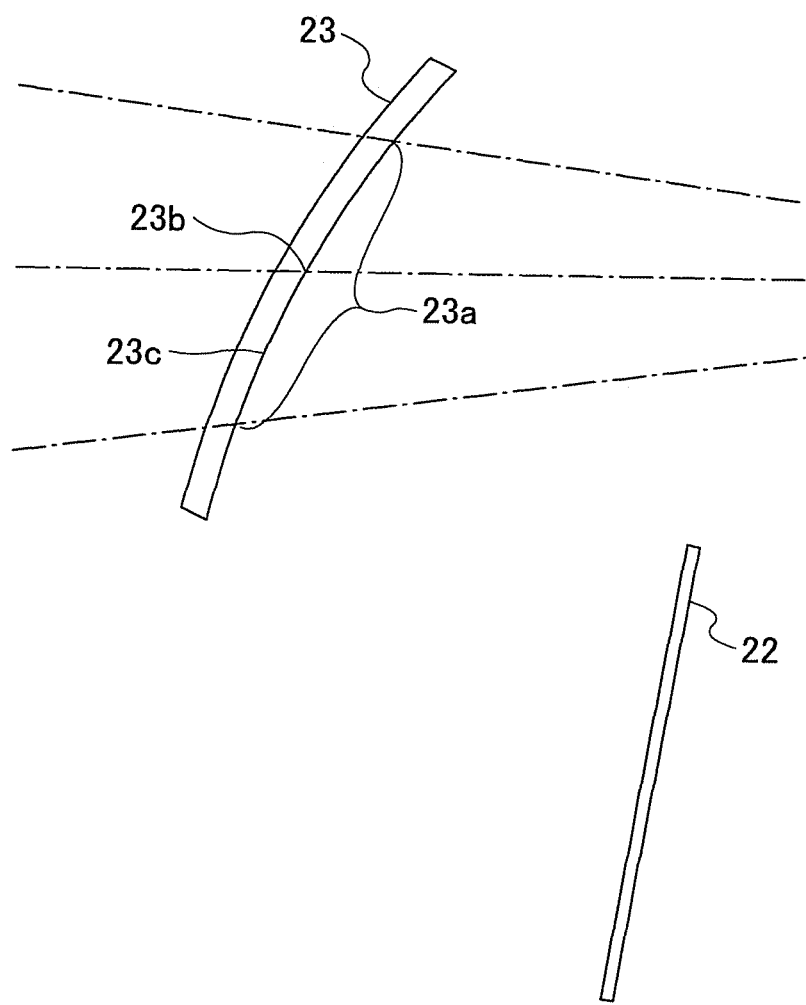
FIG. 11 is a schematic diagram illustrating a half mirror according to another embodiment of the present invention.

FIG. 11 is a schematic diagram illustrating the half mirror 23 of the second example. In the half mirror 23 illustrated in FIG. 11, the position of a vertex (deepest point) of the concave surface of the half mirror 23 is deviated approximately a few tens of mm toward the projection optical system with respect to the position of an optical center 23b of the concave surface of the half mirror 23. In this example, "optical center 23b" refers to a geometric center of an entire range 23a of the half mirror 23 that is viewable by an observer (e.g., driver of the vehicle 100). Further, the deepest point 23c is a deepest recessed part of the entire range 23a of the half mirror 23 that is viewable by the observer.

Accordingly, with the second example, the surface of the half mirror 23 toward the observer is an eccentric surface. By having an eccentric surface as the surface of the half mirror 23 toward the observer, balance can be obtained between an optical path of a light beam incident from the second mirror 22 on a part of the half mirror 23 closer to the second mirror 22 and an optical path of a light beam incident from the second mirror 22 on a part of the half mirror 23 farther away from the second mirror 22. As a result, distortion generated in the image forming apparatus 20 can be reduced.

In the second example, the optical system including the first mirror 21, the second mirror 22, and the half mirror 23 as a whole has a positive power.

Next, optical data of the second example are illustrated in Tables 4-6.

TABLE 4

|  | FIRST MIRROR 21 | SECOND MIRROR 22 | HALF MIRROR 23 |
|---|---|---|---|
| SURFACE SHAPE | CONVEX SHAPE | FLAT SHAPE | CONCAVE SHAPE |
| CURVATURE RADIUS | X DIRECTION: 446 mm, Y DIRECTION: 135 mm | INFINITE | −646 mm |
| INCIDENT ANGLE | −27 DEGREES | 44 DEGREES | 27 DEGREES |

TABLE 5

|  | TARGET SCANNING SURFACE 18 ~FIRST MIRROR 21 | FIRST MIRROR 21 ~SECOND MIRROR 22 | SECOND MIRROR 22 ~HALF MIRROR 23 |
|---|---|---|---|
| SURFACE INTERVAL | 31 mm | 92 mm | 110 mm |

TABLE 6

|  | TARGET SCANNING SURFACE 18 |
|---|---|
| RADIATION ANGLE OF TARGET SCANNING SURFACE | X DIRECTION: 0.9 DEGREES, Y DIRECTION: 0.3 DEGREES |

It is to be noted that, in the second example, the position (image plane position) of the virtual image 25 is 2 m apart from the eyeball 24 of the driver. Further, in the second example, the angle of view (surface angle view) of the virtual image 25 is 6×2 deg.

Third Example

Figure 12:
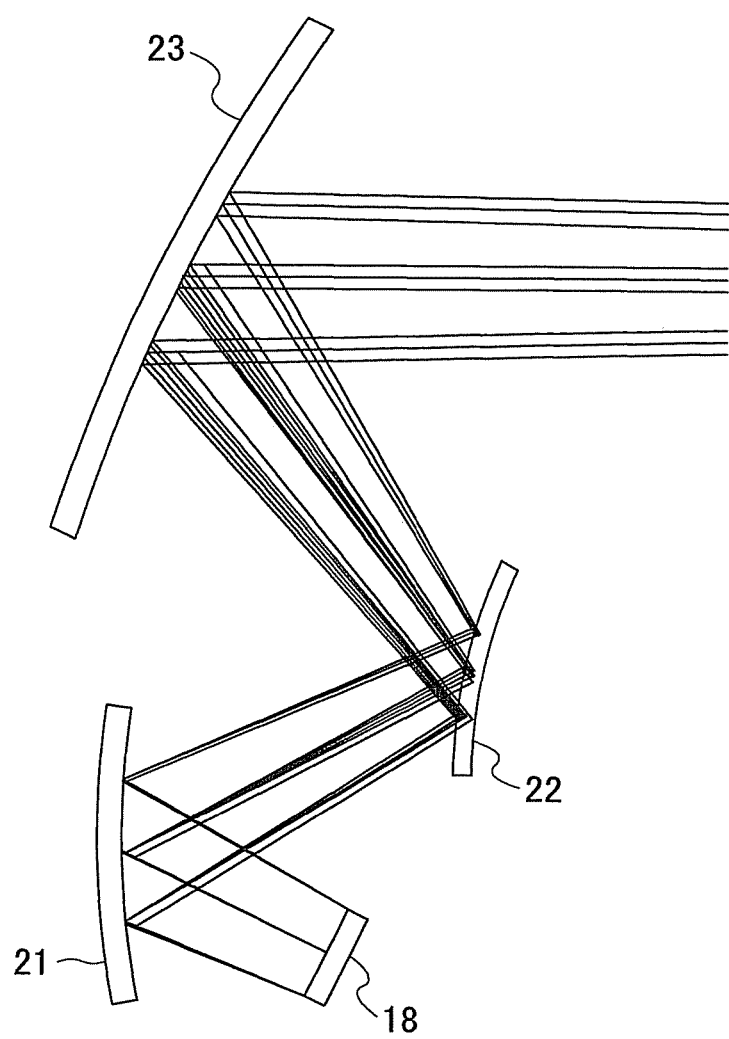
FIG. 12 is schematic diagram illustrating an optical system according to another embodiment of the present invention.

FIG. 12 is a schematic diagram illustrating an optical system according to the third example. As illustrated in FIG. 12, a concave mirror is used as the first mirror 21, a convex mirror is used as the second mirror 22, and a half mirror having a concave reflection surface is used as the half mirror 23 in the third example. In the third example, although the reflection surface of the half mirror 23 is a concave surface, a surface of the half mirror 23 opposite to the reflection surface is substantially parallel to the reflection surface. In other words, the thickness of the half mirror 23 is substantially uniform.

In the third example, the radiation angle of the target scanning surface 18 is 10.5 degrees in the X direction and 3.5 degrees in the Y direction. The scanning optical system is designed to match the radiation angle of the target scanning surface 18. The concave surface of the first mirror 21 is an anamorphic surface in which a curvature of a predetermined direction is different from a curvature of a direction orthogonal to the predetermined direction. By using an anamorphic surface as the concave surface of the first mirror 21, the curved shape of the concave surface of the first mirror 21 can be adjusted. Thereby, reflection aberration correction performance of the first mirror 21 can be improved.

The radiation angle of the target scanning surface 18 of the third example is designed to be wider compared to those of the first and the second examples. Accordingly, the length of the optical path from the target scanning surface 18 to the half mirror 23 can be shortened. Further, the length from the target scanning surface 18 to the half mirror 23 with respect to the height direction (vertical direction in FIG. 12) and the depth direction (horizontal direction in FIG. 12) can be less than or equal to the size of the half mirror 23, respectively.

TABLE 7

|  | FIRST MIRROR 21 | SECOND MIRROR 22 | HALF MIRROR 23 |
|---|---|---|---|
| SURFACE SHAPE | CONCAVE SHAPE | CONVEX SHAPE | CONCAVE SHAPE |
| CURVATURE RADIUS | X DIRECTION: −177 mm, Y DIRECTION: −250 mm | −100 mm | −300 mm |
| INCIDENT ANGLE | −27 DEGREES | 40 DEGREES | 27 DEGREES |

TABLE 8

|  | TARGET SCANNING SURFACE 18 ~FIRST MIRROR 21 | FIRST MIRROR 21 ~SECOND MIRROR 22 | SECOND MIRROR 22 ~HALF MIRROR 23 |
|---|---|---|---|
| SURFACE INTERVAL | 42 mm | 71 mm | 90 mm |

TABLE 9

|  | TARGET SCANNING SURFACE 18 |
|---|---|
| RADIATION ANGLE OF TARGET SCANNING SURFACE | X DIRECTION: 10.5 DEGREES, Y DIRECTION: 3.5 DEGREES |

It is to be noted that, in the third example, the position (image plane position) of the virtual image 25 is 2 m apart from the eyeball 24 of the driver. Further, in the third example, the angle of view (surface angle view) of the virtual image 25 is 6×2 deg.

The present invention is not limited to the specifically disclosed embodiments, and variations and modifications may be made without departing from the scope, of the present invention.

For example, although 3 light source elements 11R, 11G, 11B are used in the optical scanning device 10 according to the above-described embodiments and examples of the present invention, a single color image may be used by using a single light source element. In this case, the compositing element 14 is omitted.

Further, although an automobile is described as an example of the vehicle 100, the image forming apparatus 20 may also be mounted on other vehicles such as an airplane or, a train.

The present application is based on Japanese Priority Application No. 2011-200839 filed on Sep. 14, 2011 with the Japanese Patent Office, the entire contents of which are hereby incorporated by reference.

What is claimed is:

1. An image forming apparatus comprising:
an optical scanning device including
a light source element configured to radiate a light beam,
an optical deflector configured to deflect the light beam two-dimensionally,
a concave mirror configured to deflect the light beam deflected by the optical deflector,
and
a target scanning surface that is transparent and having a two-dimensional image formed thereon by the light beam deflected from the optical deflector via the concave mirror; and
a projection optical system including a convex mirror and configured to enlarge and project the two-dimensional image on a target projection surface;
wherein the target projection surface includes a reflection surface of a half mirror,
wherein the half mirror is positioned outside of the image forming apparatus and configured to transmit a part of a light incident on the half mirror and reflect another part of the light incident on the half mirror,
wherein the optical deflector and the concave mirror are arranged, so that a sign of a deflection angle of the optical deflector and a sign of a deflection angle of the concave mirror become opposite to each other.

2. The image forming apparatus as claimed in claim 1, wherein the target scanning surface is a diffuser configured to diffuse an incident light in a traveling direction of the incident light.

3. The image forming apparatus as claimed in claim 2, wherein a cross section of the incident light diffused by the diffuser is an elliptical shape.

4. The image forming apparatus as claimed in claim 3, wherein the diffuser is configured to form a virtual image by enlarging the two-dimensional image,
wherein the virtual image is formed in a predetermined position toward a side of the half mirror opposite to the reflection surface,
wherein a long axis direction of the elliptical shape matches a longitudinal direction of the virtual image.

5. The image forming apparatus as claimed in claim 1, wherein the convex mirror is positioned immediately in back of the target scanning surface.

6. The image forming apparatus as claimed in claim 1, wherein the target scanning surface is arranged in a position in which a normal line of the target scanning surface does not intersect the half mirror.

7. The image forming apparatus as claimed in claim 1, further comprising:
a lens configured to guide the light beam from the light source element to the optical deflector,
wherein the lens is a meniscus lens having a concave surface side facing the optical deflector.

8. An image forming apparatus comprising:
an optical scanning device including
a light source element configured to radiate a light beam,
an optical deflector configured to deflect the light beam two-dimensionally,
a concave mirror configured to deflect the light beam deflected by the optical deflector, and
a target scanning surface that is transparent and having a two-dimensional image formed thereon by the light beam deflected from the optical deflector via the concave mirror;
a half mirror including a reflection surface and configured to transmit a part of a light incident on the half mirror and reflect another part of the light incident on the half mirror; and
a projection optical system including a convex mirror and configured to enlarge and project the two-dimensional image on the reflection surface,
wherein the optical deflector and the concave mirror are arranged, so that a sign of a deflection angle of the optical deflector and a sign of a deflection angle of the concave mirror become opposite to each other.

9. The image forming apparatus as claimed in claim 8, wherein the reflection surface of the half mirror is a concave surface,
wherein a position of a deepest point of the concave surface is located toward the projection optical system more than a position of an optical center of the concave surface.

10. The image forming apparatus as claimed in claim 8, further comprising:
a lens configured to guide the light beam from the light source element to the optical deflector,
wherein the lens is a meniscus lens having a concave surface side facing the optical deflector.

11. A vehicle comprising:
an image forming apparatus including
an optical scanning device including
a light source element configured to radiate a light beam,
an optical deflector configured to deflect the light beam two-dimensionally,
a concave mirror configured to deflect the light beam deflected by the optical deflector, and
a target scanning surface that is transparent and having a two-dimensional image formed thereon by the light beam deflected from the optical deflector via the concave mirror, the target projection surface including a reflection surface of a half mirror configured to transmit a part of a light incident on the half mirror and reflect another part of the light incident on the half mirror, and
a projection optical system including a convex mirror and configured to enlarge and project the two-dimensional image on a target projection surface; and a front window that is integrated with the half mirror;
wherein the target scanning surface is configured to form a virtual image by enlarging the two-dimensional image,
wherein the virtual image is formed in a position in front of the reflection surface,
wherein the optical deflector and the concave mirror are arranged, so that a sign of a deflection angle of the optical deflector and a sign of a deflection angle of the concave mirror become opposite to each other.

12. The vehicle as claimed in claim 11,
wherein the image forming apparatus further includes a lens configured to guide the light beam from the light source element to the optical deflector,
wherein the lens is a meniscus lens having a concave surface side facing the optical deflector.

* * * * *